United States Patent

[11] 3,587,702

| [72] | Inventor | Clyde F. Kaunitz<br>1150 N. Lake Shore Drive, Apt. 4-A,<br>Chicago, Ill. 60611 |
|---|---|---|
| [21] | Appl. No. | 594,145 |
| [22] | Filed | Nov. 14, 1966 |
| [45] | Patented | June 28, 1971 |

[54] SAFETY RIM AUXILIARY
5 Claims, 9 Drawing Figs.

[52] U.S. Cl. ................................................. 152/158
[51] Int. Cl. ..................................................... B60b 25/22,
B60c 17/04
[50] Field of Search............................................ 152/158,
155, 157

[56] References Cited
UNITED STATES PATENTS

| 1,752,024 | 3/1930 | Parker | 152/218 |
| 3,142,326 | 7/1964 | Lindley | 152/158 |
| 3,180,391 | 4/1965 | Lindley | 152/158 |
| 3,237,667 | 3/1966 | Lindley | 152/158 |

Primary Examiner—Arthur L. La Point
Assistant Examiner—Charles B. Lyon
Attorneys—Miller, Morriss, Pappas, McLeod and William J. Morriss ABSTRACT: A plural link girdling structure in which all connections as between links are conic and tension the entire girdling structure thereby seating the structure in the rim throat of an automobile wheel and providing an auxiliary support for the tire tread when deflation of the tire occurs. The structure includes the concept of stanchions in position at link connections whereby the radial component force of the tension is radially applied inwardly to the wheel rim throat.

INVENTOR.
CLYDE F. KAUNITZ
BY
Miller Morriss Pappas & McLeod
ATTORNEYS

INVENTOR.
CLYDE F. KAUNITZ
BY
ATTORNEYS

SAFETY RIM AUXILIARY

FIELD OF INVENTION

The present invention relates to a safety rim auxiliary device and more particularly to a link-type structure locatable in the throat portion of an automobile tire rim and extending peripherally outwardly toward the tire tread and intermediate the side casing of the tire. The object of the safety rim auxiliary is to provide a firm intermediate support for the tread of a tire so that if the tire becomes flat or blows out the tread will contact and be supported by the safety rim thus saving the tire against rim cutting and supporting the car in relatively safe manner against violent instability until emergency repairs can be accomplished. The present invention is particularly directed to safety rim auxiliaries for tubeless tire installations.

PRIOR ART

The broad concept of a safety rim for tires has a substantial history exemplified in tube type tires and rims by the U.S. Pat. No. 2,102,551 to Woodward and as applied to tubeless tires in the U.S. Pat. Nos. 2,986,189; 3,141,490; 3,142,326 and 3,237,667 to Lindley.

In order to assure secure contact of safety rim to wheel rim the prior art has required that substantial attention be directed to sealing the bolt connectors at the rim in order to avoid escape of air from the tire cavity while providing a noninterfering structure with the tire mounting. Collaterally most of the prior art devices involve special tooling for each wheel rim served and in the Lindley devices segments are secured to provide the peripheral extension around the rim which presumes a highly accurate fit of rim contact surface to the safety rim extension.

The present invention seeks to substantially simplify the problems of prior safety rim auxiliaries by providing a modular link structure which girdles the throat of the rim and which is self tensioning so as to accommodate a wide range of rim dimensional variances and in extreme instances of adjustment extends to the deletion and addition of links as where, for example, the number of links is high.

Accordingly the principal object of the present invention is to provide a plurality of tensionable links so that upon application of tension in the links a component in inward radial force seats the composite safety rim auxiliary securely in the wheel rim throat.

Another object is to provide a link structure capable of being formed by stampings thereby assuring uniform modular construction at reasonable cost and at no sacrifice of strength.

Still another object is to show a tension adjusting structure involving cones nesting in secure relation to each other so that the cones assure tensioning of the girdling structure at each joint in the link.

Still another object is to provide an outer peripheral flange plate to which resilient hobs are secured to provide a compressible lateral and longitudinal bearing contact with the tire tread when the tire is deflated.

A further object is to provide for tension adjustment of auxiliary link structure to rim where the links form identical bridge pieces bearing on intermediate stanchions or pedestals and wherein the pedestals support the girdling bridge elements and securely contact the rim throat and wherein economical stampings may be used in all parts.

Other objects including noninterference with tire mountings, inherent lightweight, and rugged dependability will be appreciated by those skilled in the art as the description proceeds.

GENERAL DESCRIPTION

In general the present invention utilizes a plurality of link elements assembled together in end to end girdling relation and including an inner peripheral surface mating or seating in the throat depression of a wheel rim and including an outer peripheral surface spaced outwardly from the rim throat and providing a flange surface supporting a deflated tire against full collapse. Each connection in the link structure includes adjustment means whereby tension is applied to the links diminishing their circumference and causing a resultant force to be applied radially and inwardly thereby locking or securing the link structure against radial or lateral displacement. Hence, the holding forces are link generated by tightening the link connections. The preferred adjustment, as will be seen, involves the nesting of conic elements so that as these elements are drawn toward nesting the entire link girdle is tensioned.

Considering the plurality of connections, and where number permits, one or more links may be added and deleted to adjust a particular link size to a particular rim fit and hence avoiding separate tooling for each size rim served.

As will be seen in the preferred embodiment the links form bridges and the tension in the links is translated to radial inward force at the stanchions, thus reducing the number of different parts required and allowing the apparatus of the present invention to be ideally suited for construction from a pair of dies or tools, one producing the stanchion pieces, and one producing the bridge elements or link spans. Rigid support in the throat area is secured and stress in the bridge link pieces urges transmittal of stresses to the radially and inwardly loaded support stanchions. In the preferred embodiment adjustability to size variations in rim throat is greatly facilitated. In the preferred embodiment the conic form of tension inducement at the connections is repeated in modified form. The grommetlike hobs flattened on the top are easily assembled to the outer peripheral face of the bridge pieces and the resulting combination is a multilateral cushion contact with tread adjusting for minor diametral variances. A wide variety of materials is available for forming links and stanchions such as steel stampings, aluminum stampings, magnesium stampings and alloyed stampings, all inlet for weight savings at no sacrifice of strength. Collaterally castings and forgings may be employed as well as resin materials having sufficient strength characteristics. In the Drawings:

SPECIFIC DESCRIPTION

Figure 1:
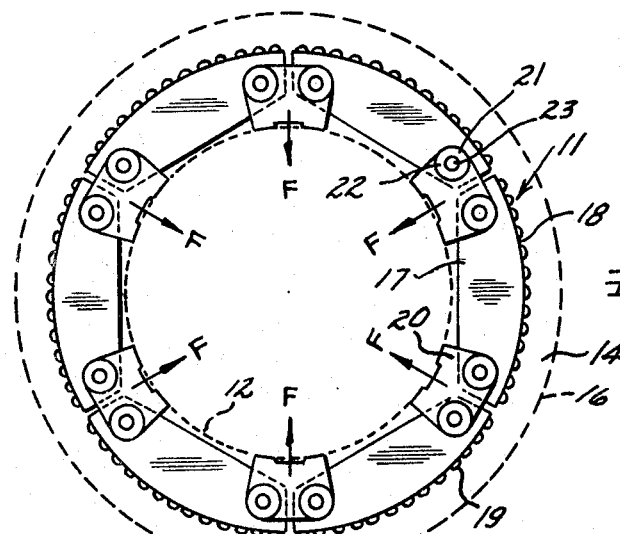
FIG. 1 is a somewhat schematic side elevation view of a link-type safety rim auxiliary in accord with the present invention and including force arrows indicating the gripping thrust as the link circumference is reduced.

Referring to the drawings and most particularly with respect to FIG. 1, thereof, the safety rim auxiliary 11 encircles a wheel rim 12 and seats in the throat area 13 of the rim 12. The rim 12 carries an automobile tire 14, sized to fit the particular rim 12, and the tire 14 is retained by the rim flanges 15 and upon inflation of the tire 12 the inner periphery of both tire walls are seated securely in the position best shown in FIG. 4. The safety rim 11 girdles the wheel rim 12 and peripherally extends outwardly from the throat portion 13 intermediate the sidewalls of the tire 14. The safety rim 11 extends beyond the outer diameter of the flanges 15 but not so far as to cause contact with the tread portion 16 of the tire 14 under normal inflation conditions. In emergency situations where the tire 14 is deflated, such as where a puncture or blowout occurs the depressed tread 16' does engage the safety rim 11 and is prevented from further collapse, as seen in the FIG. 4. This allows the driver to maintain vehicular control and to seek repairs without immobilizing the vehicle. During this period the tire 14, at slow speeds is protected against rim cuts and total damage.

In the preferred embodiment of the invention of FIGS. 1—5 the safety rim 11 is made up of identical bridge link elements 17 which are of boxlike or channel cross-sectional configuration while providing an outer curvilinear profile. Together, the outer surfaces 18 of the bridge link elements 17 approximate a circumference concentric about the wheel rim 12. The outer surfaces 18 of the bridge link elements are preferably resiliently faced as by the hoblike grommets or buttons 19. This prevents metal to tire contact when the safety rim 11 is engaged with the tire 14 and provides a substitute resiliency for the lost pneumatic support while acting as a tracking guide in support of the tire tread 16'. This tracking guide materially assists in confining the tire 14 between the rim flanges 15 when the tire 14 is run in deflated condition.

Intermediate adjacent bridge links 17 are support stanchions 20. The stanchions 20 extend radially inward to contact with the throat area 13 of the wheel rim 12 and hence support the assemblage of bridge links 17 against collapse or against centrifugal outward forces applied when normal inflation obtains with high driving speed. The stanchions 20 provide connection of adjacent ends of links 17 thereto and transmit tension in the links 17 to the entire girdling structure while a component of that same tension causes radial inward thrust through the stanchion 20 to assure firm seating of the stanchions 20 on the rim 12. The connections 21 of bridge links 17 to stanchions 20 are adjustable so that tightening of the connection applies the tension to the entire safety rim 11 tending to reduce the pitch diameter of the girdle of links 17. This preferably is accomplished by causing conic projections 22 on the stanchions 20 to tend to nest with similar conic depressions provided in the bridge links so that upon drawing the bridge link elements into contact with the stanchion elements 20 as by bolts 23, transversely passed through both bridge links 17 and stanchions 20, the links 17 are drawn toward conic register to the extent allowed by a slotted or oversize opening 24 in the bridge element 17 thereby tensioning the entire girdling safety rim 11. The amount of circumferential adjustment at each connection 21 may be accumulated in all of the connections so as to about equal, in total adjustment, slightly over one-half the distance span between connector depressions 22 in each link. This allows a full range of adjustment to wheel size by removal or addition of a link where desired where large numbers of links are employed, i.e., 24 links. This adjustment at the connections 21 tensions the entire safety rim despite the number of links involved and tightens the stanchions against the wheel rim 12 in a secure manner at a plurality of spaced intervals depending upon the number of links used.

Figure 2:
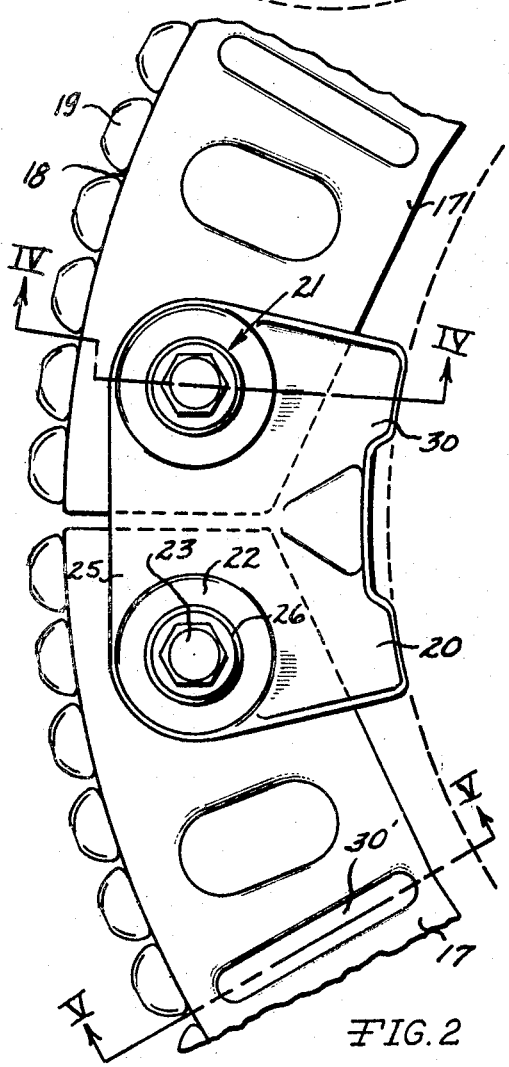
FIG. 2 is a partial side elevation view of a link-type safety rim auxiliary taken at the connection of the bridge links to the stanchion.
Figure 4:
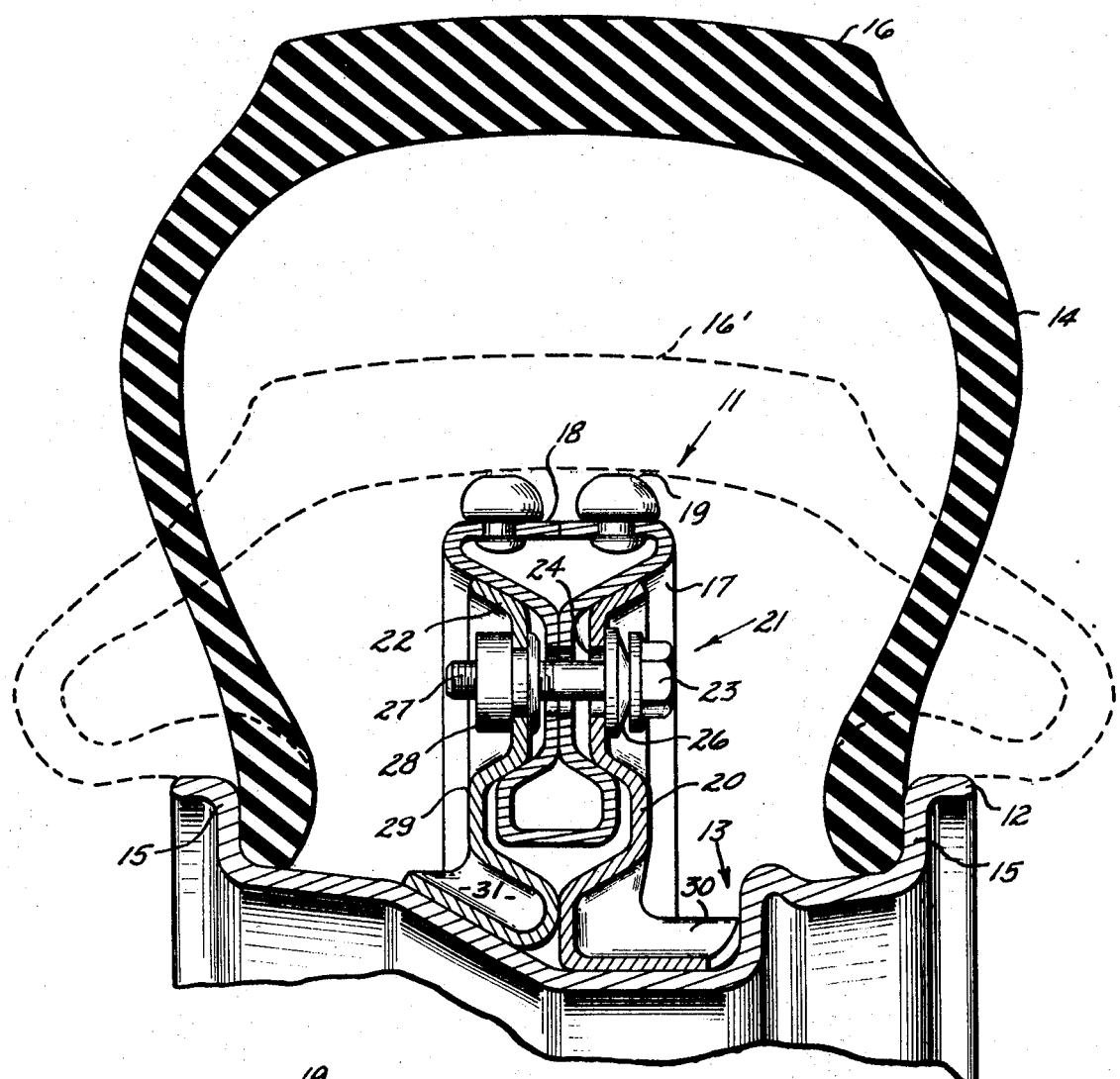
FIG. 4 is a cross section elevation view taken on the line IV-IV of FIG. 2 at the bolt line between bridge link and stanchion and indicating in phantom line the normal positioning of the safety rim auxiliary in relation to the throat of the wheel rim and the tire in inflated and deflated position.

In FIG. 2 the stanchion 20 is best appreciated as comprising a platelike support surface outer face surface 25 in which the conic depressions 22 are formed to provide the adjustable connectors 21. The bolts 23 are passed through the stanchion 20 and bridge link 17 as best seen in FIG. 4. A Belleville-type washer 26 is placed beneath the head of the bolt 23 to assure a tensioned or stressed thread connection and threaded shank 27 of the bolt 23 engages the nut 28 secured to the opposite plates 29 of the stanchion 20. The foot or leg structure 30 and 31 in the plates 25 and 29 respectively of the stanchion 20 are formed to generally mate with the throat configuration of any specific rim. These feet 30 and 31 secure the stanchions 20 against lateral displacement and provide secure support for the safety rim 11 comprising the periphery of extending bridge links 17. Where desired, serrations may be applied to assure a nonskid grip at the interphase between wheel rim 12 and stanchion 20.

Figure 3:
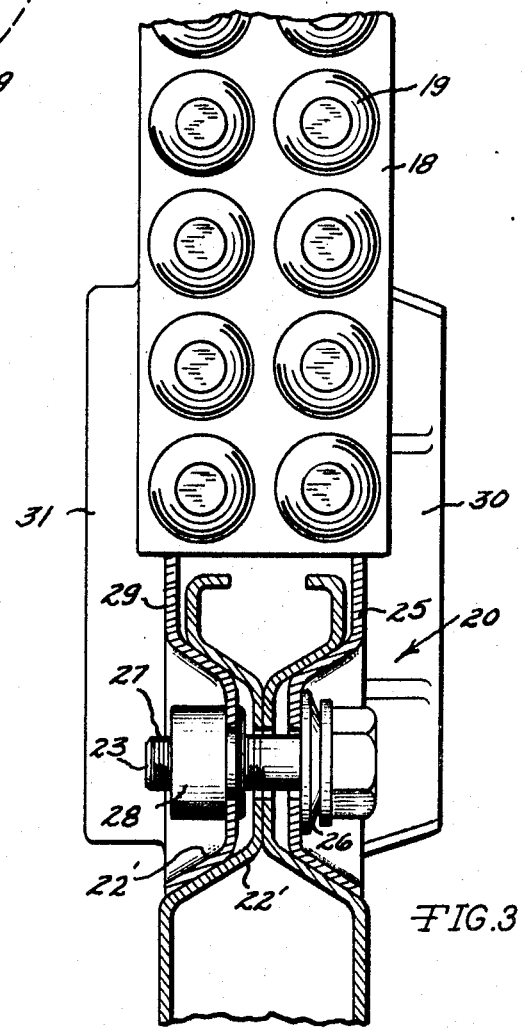
FIG. 3 is a partial cut away end elevation view of the structure in FIG. 2 with bolt removed and indicating the nesting cone portions as between bridge links and stanchion pieces.

A resilient contact surface is provided on the outer surface 18 of the bridge links 17. The preferred embodiment where the bridge links 17 are formed as stampings is to perforate the surface 18 to allow insertion of rubberlike grommets or hobs 19 flattened on the outer surface as shown in FIGS. 3 and 4. These hobs 19 are provided in rows of pairs as shown, and buffer tread contact with metal, while providing control against lateral displacement of the tread. The interval between rows should approximate the mean gap or distance between the end grommets 19 on adjacent bridge links 17. As against prior known buffer elements the hobs 19 provide a multilateral support as contrasted with grooved or gear tooth designs.

Figure 5:
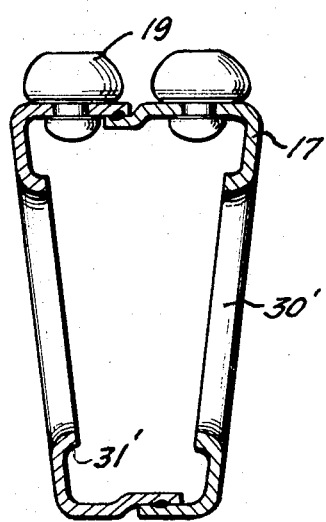
FIG. 5 is a cross section elevation view taken on line V-V of FIG. 2 and indicating the configuration of the bridge links at an opening therethrough.

In FIG. 3 the surface pattern of grommet hobs 19 is best appreciated and at the bolt 23 the ultimate nesting as between conic surfaces 22 and mating surfaces 22' in the bridge links 17 is shown. The cross section of FIG. 5 illustrates the strength available in the box form of the stampings comprising bridge link 17 and illustrates the reduction of weight by removal of stock at opening 30' and at the retention of strength web 31' thus rigidifying the total construction. Collaterally, such openings established substantially on radius lines facilitates the provision of the surface 18 in curvilinear wheel-concentric form.

In the preferred embodiment of the invention and particularly in the FIGS. 2—5 the invention has been shown as an assemblage of stampings which may be from steel, aluminum, magnesium, or a variety of alloys and resins. This provides minimum weight, maximum strength for weight ratios and admits of most economic module construction. It will be appreciated, however that other materials in cast, forged or lay-up form may be used without departure from the spirit of the invention herein expressed. Likewise, the preferred grommets or hobs may take other forms well known in the cushion attachment art and dependent largely upon the fastening desired and the material to which the resilient surface is to be attached.

Figure 6:
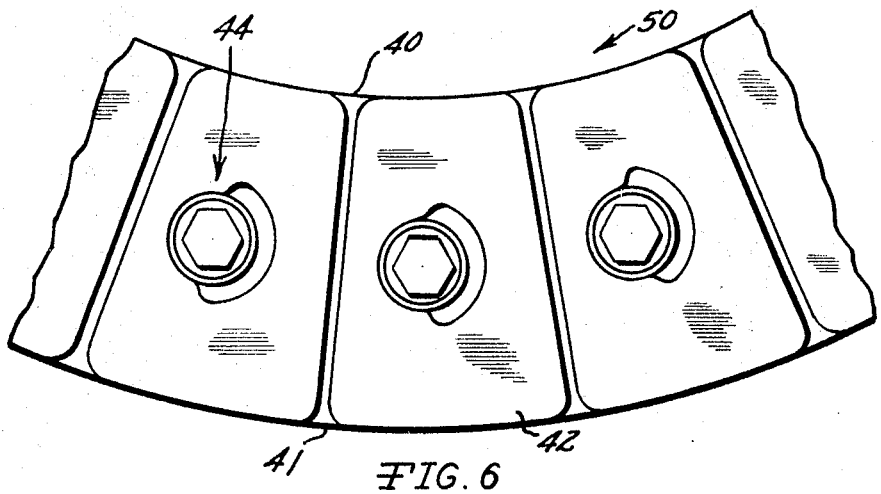
FIG. 6 is a modified form of the link-type safety rim auxiliary in fragmental side elevation.
Figure 7:
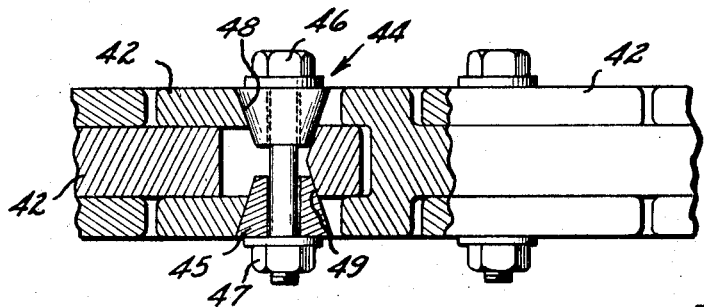
FIG. 7 is a top plan view of the structure illustrated in FIG. 6 and partially cut away to reveal the cone-type connector acting to draw adjacent link ends together.

By reference to FIGS. 6—9 inclusive, several modifications of the invention will be readily appreciated. By utilizing a link construction the length of the girdle may be diminished, as shown, using the conic concept for adjustment and tensioning of the links at the connections. Accordingly, the links per se may be used as a wheel rim contact surface in which the inner periphery 40 bears against the throat of a wheel rim (not shown) and wherein the outer periphery 41 conforms and is substantially concentric about and extending from the wheel rim intermediate the walls of the tire. Where desired, the outer periphery 41 may be provided with a resilient cushion as by adherence or grooving to accommodate a resilient girdle or band. In FIG. 6 and in FIG. 7 individual links 42 are forged or cast and the ends of each interlock with the next adjacent link in a tongue and clevis relationship. Connections 44 secure the interlock relation of links 42 and is dependent upon the use of conic inserts 45 moved toward and away from each other by tightening or loosening bolt 46 and nut 47. The conic inserts 45 urge surfaces 48 on one link 42 and surfaces 49 on the adjacent link 42 apart from each other and in this manner draw the adjacent links 42 into closer relation with each other, thereby reducing the pitch diameter of the entire safety rim 50 with attendant tightening on the wheel rim. The cumulative adjustment at all connections 44 allows a wide range of adjustment to variant wheel sizes and is of a total amount to allow addition or subtraction of links 42 to accommodate wider variations in rim size where a large number of links are employed.

Figure 8:
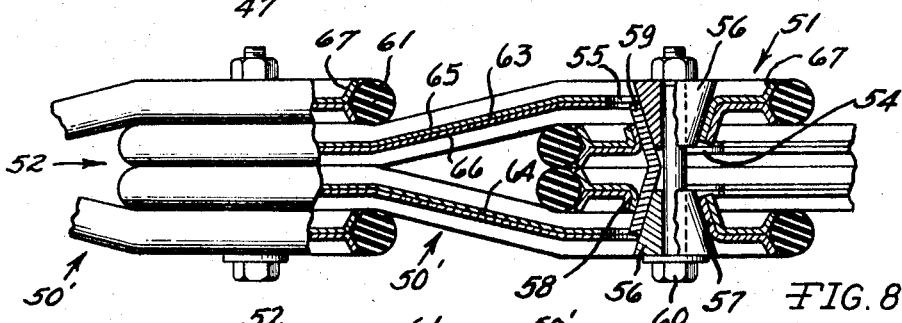
FIG. 8 is a partial cross section top plan view of a modified link-type safety rim utilizing stamped links as shown in the FIG. 9.
Figure 9:
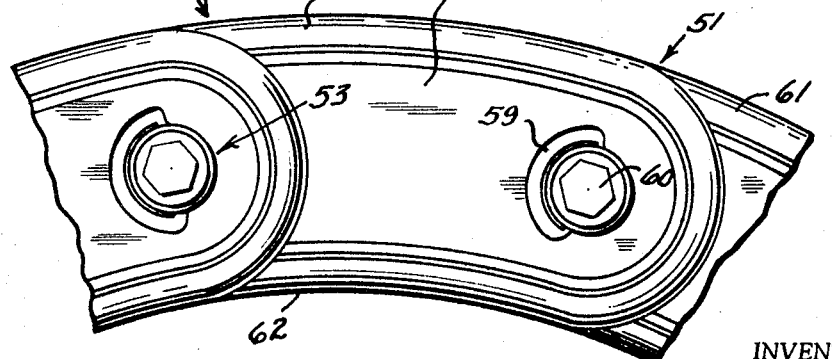
FIG. 9 is a front elevation view of a modified link as shown in the composite form in FIG. 8 and in accord with the present invention.

FIGS. 8 and 9 represent another variant or modification of the present invention in which composite stampings are utilized. The links 50' which form the safety rim girdle are provided with a clevis portion 51 at one end and a tongue portion 52 at the other end. The tongue portion 52 of one link 50' is inserted in the clevis portion 51 of the adjacent link and the adjacent links 50' are then tightened together by adjustable connectors 53 which pass through openings 54 and 55 in the links 50' so that conic inserts 56 bear upon clevis end conic flange 57 and tongue end conic flange 58 tending to separate the two surfaces and hence to bring the links 50 into closer circumferential engagement. Since the tongue end conic flange 58 has less surface for stress distribution than the clevis end conic flange 57, a stress shoe 59 is utilized. As the bolt 60 is tightened the conic inserts 56 are urged into the opening to accomplish a spreading of surfaces 57 and 58 and tension is applied to the links 50' as the pitch diameter is reduced thereby tightening the safety rim of FIGS. 8 and 9 against the throat portion of a wheel rim (not shown). In the modification of FIGS. 8 and 9 a resilient track 61 may be maintained in encircling relation of each link 50'. The outer periphery of each link 50' is substantially concentric with the wheel rim served when the safety rim is tightened in place and the inner periphery 62 engages the wheel rim. As seen the link 50' comprises opposed cheek plates 63 and 64 which are each in turn formed by nesting and mating sheet elements 65 and 66 are flared to provide the mounting means 67 for resilient track cushion 61.

The stampings as shown in the FIGS. 8 and 9 may be suitably ribbed to provide desired strength. Various materials may be used and the cumulative adjustment at each connection provides conformance to a substantially wide range of wheel sizes, with larger variations available by addition or deletion of links where a large number of links make up the auxiliary rim. The cheek plates 63 and 64 forming the links 50' may be welded, riveted or otherwise secured together as desired.

In operation, the safety rim auxiliaries of the present invention are amenable to packaging in simple cartons for field assembly and adjustment to rim tolerances and even wheel size variations. Fastening is facilitated and the profile of the structure allows assembly of tire to rim with minimum interference. The tensioning of the safety rim auxiliary is simply accomplished with handtools and the total added weight over previously known devices is substantially minimized while providing adequate emergency support strength. The devices of the present invention provide a substantial safety supplement for automobiles at a time of great concern in the industry.

Having thus described my invention, and including a specific preferred embodiment thereof, other improvements, modifications, and changes will occur to those skilled in the art and such improvements, modifications, and changes are intended to be included herein limited only by the scope of the hereinafter appended claims.

I claim:
1. A link-type safety rim auxiliary comprising:
    a plurality of bridge links each having a substantially identical form and each defining identical ends;
    a plurality of stanchions secured to the ends of adjacent of said bridge links and extending radially inwardly in support of said links; and
    securing means connecting said stanchions to said ends of said bridge links, and securing means, when tightened, tensioning said links and reducing the pitch diameter of said links whereby said stanchions are urged radially inwardly against a supporting wheel rim surface.
2. A safety rim in accord with claim 1 wherein each of said bridge links possesses a boxlike cross section configuration and the outer face thereof having resilient hoblike elements secured thereto and extending therefrom in a tread pattern.
3. A safety rim in accord with claim 1 wherein said bridge links and said stanchions are hollow and configured to resist deformation from tension and compression forces and translating such stresses to said wheel rim surface.
4. An auxiliary safety rim positioned between a wheel rim and tire and within said tire comprising:
    a plurality of bridge link elements each of said links being connected to the next adjacent of said links in an endless loop;
    a connection as between said adjacent links drawing said links selectively toward and away from each other; and
    a plurality of stanchion elements one at each of said connections and urged radially inwardly to contact with said tire rim and by reduction in pitch diameter of said links and supporting said links and said connections in spaced relation from said tire rim.
5. An auxiliary safety rim intermediate a wheel rim and tire comprising:
    a plurality of identical hollow bridge link members each being connected to the next adjacent of said links in end to end relationship to form an endless loop;
    hollow stanchion elements at each of the connections as between said link members, said stanchions extending radially inwardly to mating contact with a wheel rim; and
    tensioning means adjustably tensioning said links at the connections to said stanchions whereby said links are placed in tension and said stanchions in consequent compression secure against said wheel rim.